United States Patent
Li et al.

(10) Patent No.: US 9,203,452 B2
(45) Date of Patent: Dec. 1, 2015

(54) ADAPTIVE HARMONIC REJECTION RECEIVING DEVICE AND METHOD

(71) Applicant: MONTAGE TECHNOLOGY (SHANGHAI) CO., LTD., Shanghai (CN)

(72) Inventors: Zhenbiao Li, Shanghai (CN); Jun Xu, Shanghai (CN)

(73) Assignee: MONTAGE TECHNOLOGY (SHANGHAI) CO., LTD., Shanghai (CN)

( * ) Notice: Subject to any disclaimer, the term of this patent is extended or adjusted under 35 U.S.C. 154(b) by 23 days.

(21) Appl. No.: 14/109,195

(22) Filed: Dec. 17, 2013

(65) Prior Publication Data

US 2015/0031320 A1  Jan. 29, 2015

(30) Foreign Application Priority Data

Jul. 26, 2013 (CN) .......................... 2013 1 0321111

(51) Int. Cl.
*H04B 1/16* (2006.01)
*H04B 1/12* (2006.01)

(52) U.S. Cl.
CPC ...................................... *H04B 1/123* (2013.01)

(58) Field of Classification Search
CPC ...... H04B 1/26; H04B 17/006; H04B 17/004; H04B 1/1027; H04B 17/0057; H04B 11/28; H04B 1/30; H03D 3/004; H03D 7/161; H03D 3/007; H03D 7/165; H03D 7/1441; H03D 1/30; H03D 7/00
USPC ........... 455/132–136, 161.1–161.3, 205, 207, 455/226.1–226.3, 230, 234.1, 240.1, 323, 455/334

See application file for complete search history.

(56) References Cited

U.S. PATENT DOCUMENTS

| | | | |
|---|---|---|---|
| 2004/0257479 A1* | 12/2004 | Su | 348/731 |
| 2013/0300489 A1* | 11/2013 | Mishra et al. | 327/355 |
| 2014/0179251 A1* | 6/2014 | Persico et al. | 455/226.2 |

* cited by examiner

*Primary Examiner* — Nhan Le
(74) *Attorney, Agent, or Firm* — Global IP Services; Tianhua Gu

(57) ABSTRACT

The invention provides an adaptive harmonic rejection (HR) receiving device, including a low noise amplification module; at least one HR mixer; at least one non-harmonic rejection (NHR) frequency mixer; and a control device. A received signal passes through the low noise amplification, and then passes through the at least one HR mixer or the at least one NHR mixer; the control device measures a receiving signal strength index (RSSI) after the received signal passes through the at least one HR mixer or the NHR mixer, and selects an NHR mixer or an appropriate HR mixer for the received signal according to a result of the measurement. The adaptive HR receiving device of the present invention is capable of adaptively judging whether to implement HR or determining which HR to implement according to features of the received signal, thereby improving the reception flexibility and reception performance.

17 Claims, 4 Drawing Sheets

US 9,203,452 B2

ADAPTIVE HARMONIC REJECTION RECEIVING DEVICE AND METHOD

CROSS REFERENCE TO RELATED PATENT APPLICATION

The present application claims a priority of the Chinese patent application No. 201310321111.8 filed on Jul. 26, 2013.

BACKGROUND OF THE INVENTION

1. Field of Invention

The present invention relates to an adaptive harmonic rejection (HR) receiving device and method, and specifically to an adaptive HR receiving device and method in a broadband communication system.

2. Description of Related Arts

In broad band system, input frequency range could cover several octaves. For example, in cable TV system (DVB-C), input frequency runs from 111 MHz to 862 MHz. Thus the mixer could down-convert input signals around local oscillation (LO) harmonics to the desired band, then cause receiving degradation, and even failure. To avoid this, harmonic rejection (HR) receiver with the certain degree rejection is extensively used in broad band system. Realizations of harmonic rejection receiver (HRR) employ RF (radio frequency) tracking filter and harmonic rejection mixer.

However, the HR receivers have linearity degradation than non-harmonic rejection (NHR) receivers, and even introduce more noise. In previous realization, all the existing manners for harmonic rejection are all passive, that is, within the band needed harmonic rejection, HR mixer is fixed in the receiver chain and it does not have freedom to switch back to non-harmonic rejection receiving chain even when there is weak signal or no signal presenting at LO harmonic frequency. HR mixer is more complex than a simple hard-switching mixer and the complexity of HR mixer is usually paid by NF and linearity degradation.

BRIEF SUMMARY OF THE INVENTION

For the above disadvantage in the prior art, the present invention provides an adaptive HR receiving device and method, to solve the problem in the prior art that all the existing HR mixer fixed in the receiver chain does not have freedom to switch back to non-harmonic rejection receiving chain. The adaptive HR receiving device as given in the present invention could cover harmonic rejection band with either HR mixer or non-HR mixer depending on the receiving band channel information and could also switch freely between high-performance non-harmonic rejection receiver and multiple harmonic rejection receivers, without introducing additional receiving performance degradation.

In order to realize the described functions, the present invention provides an embodiment of an adaptive HR receiving device, which includes: a low noise amplification module; at least one harmonic rejection (HR) mixer; an NHR mixer; and a control device used to select an appropriate mixer for a received signal. The input signal first goes into low noise amplification module, and then passes through the at least one HR mixer or the NHR mixer; the control device detects a receiving signal strength index (RSSI) after the received signal passes through the at least one HR mixer or the NHR mixer, and selects an NHR mixer or an appropriate HR mixer for the received signal according to a result of the measurement.

Preferably, the low noise amplification module in the foregoing embodiment is a low noise transconductance amplification (LNTA), and the control device further includes a trans-impedance amplifier (TIA) module; the signal is converted to a current signal after passing through the LNTA, and is converted to a voltage signal at an output of the TIA after passing through the at least one HR mixer or the NHR mixer.

Preferably, in the above embodiment, the LNTA includes a load, and the load of LNTA is divided into several bands; the load of each band is formed of an L-C radio frequency filter and a switch; each band covers part of the input frequency range, and only one band is enabled during the same time period.

Preferably, the LNTA in the above embodiment includes a plurality of band selecting (BS) switches; BS switches' outputs connect to both HR mixers inputs and NHR mixer inputs. BS switches' inputs connect to load circuits of the specific load respectively. And only one BS switch operates in on mode during the same time period.

The present invention further provides an adaptive HR receiving method, including steps of: calculating a harmonic frequency of a received signal for each harmonic; after the received signal passes through a low noise amplifier, an HR mixer, or an NHR mixer, selectively detecting a receiving signal strength index (RSSI) of an HR mixer's or an NHR mixer's signal path corresponding to the harmonic frequency for each order according to the harmonic frequency of a received signal for each harmonic order; and selecting an appropriate frequency mixer for the received signal.

As described above, the adaptive HR receiving device of the present invention is capable of adaptively determining whether to implement harmonic rejection and also determining a suitable or appropriate harmonic rejection mode according to the received signal features, thereby providing freedom to switch back and force between harmonic rejection and non-harmonic rejection without degrading overall system performance.

According to an exemplary embodiment of the present invention in which an LNTA and a TIA are adopted, since the signal is voltage only at LNTA input or TIA output, there is current mode between them, the adaptive HRR working in current mode has excellent linearity.

According to another exemplary embodiment of the present invention, in which an LNTA with an L-C radio frequency tracking filter as load is adopted, RF tracking filter will help reject interference on harmonic frequencies even if the NHR mixer is used.

According to still another exemplary embodiment of the present invention, all BS switches are made in NMOS and operate in on/off mode, i.e. NMOS' are either off, or in linear region. Since signal is passed in current mode through BS switches, the linearity performance can be greatly enhanced. The BS switches will contribute little in over IIP3 distortion.

DETAILED DESCRIPTION OF THE INVENTION

Figure 1:
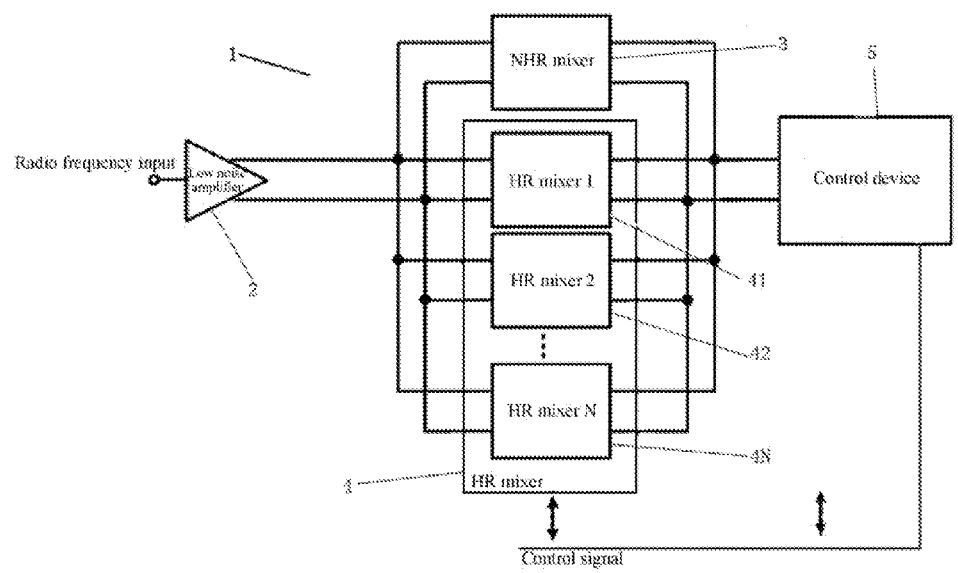
FIG. 1 shows a block diagram of an adaptive HR receiving device according to the present invention.

The implementation of the present invention is described below through specific embodiments, and a person skilled in the art could easily understand other advantages and efficacy of the present invention according to the disclosure of the specification. The present invention can also be implemented or applied in other specific implementations. Based on different perspectives and applications, various modifications or alterations may be made to the details of the specification without departing from the concept of the present invention.

Before detailed description about the present invention with reference to the accompanying drawings, it should be noted that the drawings provided in this embodiment are merely used to illustrate the basic idea of the present invention in a schematic way; therefore, the drawings only show related components of the present invention and are not drawn in accordance with the number, shapes, and sizes of the components during practical implementation. The pattern, number, and proportion of the components during practical application may be changed randomly, and the layout pattern of the components may be more complex.

In addition, in the drawings, unless otherwise specified, identical signs in different drawings represent the same module or functional part.

FIG. 1 shows a block diagram of an adaptive HR receiving device according to the present invention. The receiving device as a whole is marked as 1, and includes a low noise amplifier 2; an NHR mixer 3 covering the whole input frequency band; an HR mixer 4, which represents a group of frequency mixers 41, 43, . . . , 4N with rejections on different harmonics; and a control device 5 for selecting an appropriate frequency mixer for a received signal. The NHR mixer and the HR mixer share one input.

During the operation of the adaptive HR receiving device of the invention, a received signal (or referred to as an input signal) first enters the low noise amplifier 2, and herein the received voltage signal is converted to output voltage or current; if the received signal is converted to current, this signal will be mixed down to baseband frequency by one of the HR mixers or NHR mixer. Subsequently, the signal then enters the control device 5; the control device 5 is used to detect desired signal power, and a measurement result is referred to as receiving signal strength index (RSSI). On way to obtain RSSI is through digital circuits. In this embodiment, the control device 5 detects the RSSIs after the received signal goes through the HR mixer and the NHR mixer respectively, and selects an appropriate frequency mixer for the received signal according to the detect result. When one of the mixers is working, the others will be powered down and have little impact on the system performance.

Figure 2:
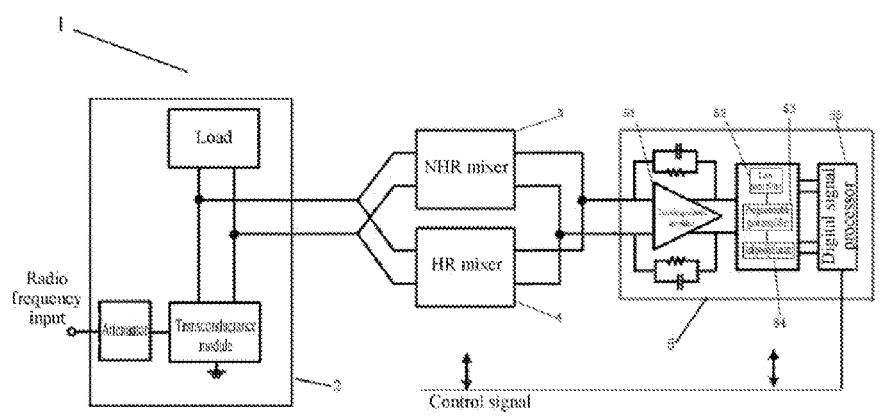
FIG. 2 shows a block diagram of an exemplary embodiment of an adaptive HR receiving device according to the present invention.

The following describes an exemplary implementation of an adaptive HR receiving device according to the invention in more details with reference to FIG. 2. To simply the description, there is only one HR mixer 4 in the receiving device, and in practical application, one or more HR mixers may be used as required.

Sign 2 in FIG. 2 is an implementation of the low noise amplifier 2 in FIG. 1, which is called as low noise transconductance amplifier (LNTA), and has an attenuator (or referred to as attenuation network) 21, a transconductance module 22, and a load 23 at input thereof. Sign 5 is an implementation of the control device 5, and includes a trans-impedance amplifier (TIA) 51, an analog channel selecting filter (low pass filter (LPF) in zero IF receiver) 52, a programmable gain amplifier (PGA) 53, an analog to digital converter (ADC) 54, and a digital signal processing (DSP) module 55.

After passing through the attenuator 21, the input signal is converted from the voltage to a current at the transconductance module 22, and then enters the load 23. The load 23 forces the current to enter an input of an HR or NHR low-impedance frequency mixer. The current is converted to a baseband (BB) signal after passing through the NHR mixer 3 or the HR mixer 4 and is summed at the input of the TIA 51, then converted to a voltage at the output of the TIA 51, then is digitized at low pass filter (LPF) 52, programmable gain amplifier (PGA) 53 and ADC (analog to digital converter) 54. After that, the digital signal enters DSP (digital signal processing) 55. DSP (digital signal processing) 55 could calculate RSSI easily. RSSI could be used for adaptive harmonic rejection decision.

In this way, the signal is voltage only at LNTA 2 input and TIA 51 output, and there is current mode between them. The benefit of such implementation is that the adaptive HR reception can have an excellent linearity during the current mode.

Figure 3:
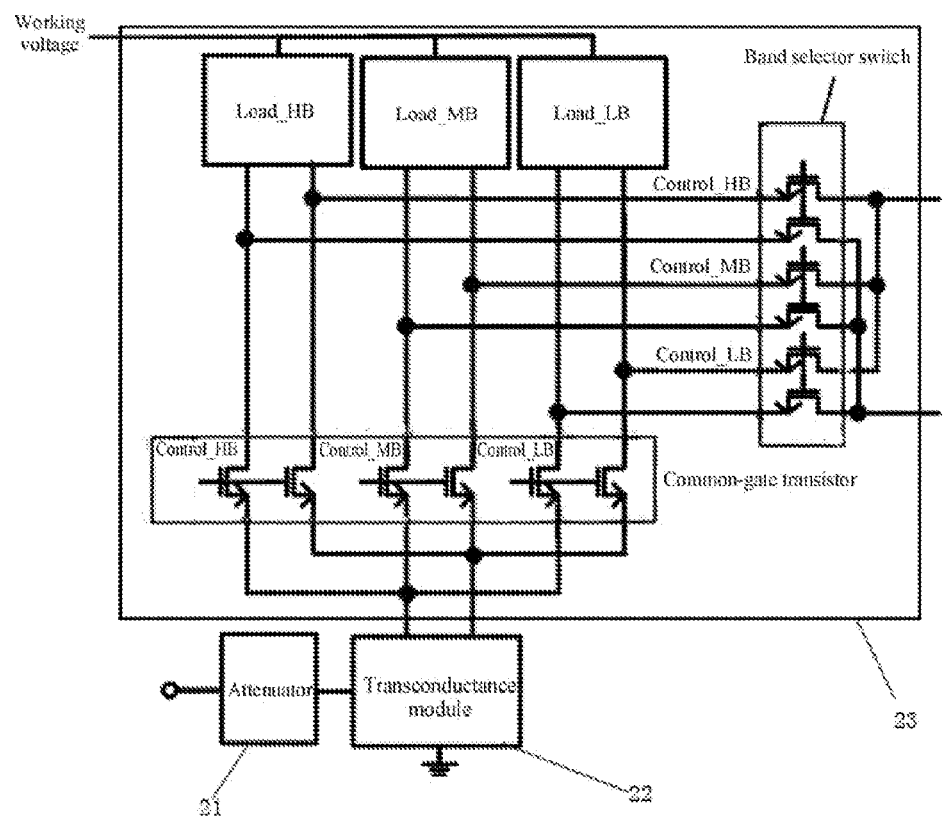
FIG. 3 shows a circuit schematic of LNTA load in FIG. 2.

FIG. 3 shows a circuit schematic of the load module 23 in the LNTA 2. The load 23 is divided into loads of three bands: high frequency bands (HB), middle frequency band (MB) and low frequency band (LB). And the load 23 further includes a band selecting (BS) switch. Each band covers part of the input frequency range. Only one band is enabled during the same time period, i.e. only one control signal of ctrl_HB, ctrl_MB and ctrl_LB is on. Each band is composited by cascode transistors (dash rectangle marked in the figure) and load circuit (Load_HB, Load_MB and Load_LB). Load circuit may be implemented by a LC Tank which forms a 2nd order RF tracking filter or a simple resistor load.

BS switches' output connects to both HR mixers inputs and NHR mixer inputs. BS switches are made in NMOSs and operate in on/off mode. As only one band is enable during the same time period, only one pair of NMOS are on correspondingly during the same time period. Between the BS switches output and the NHR or HR mixer input, it is also possible to insert other stages, for example, the mixer gain control stage. As long as inserted stage is operated in current mode, it will not affect the designed performance much.

One advantage of this implementation is that different frequency response such as RF tracking filtering can be achieved for different frequency bands. A 2nd order RF tracking filter will help rejecting interference on harmonic frequencies even if the NHR mixer is used.

Another advantage of this implementation shown as FIG. 3 is that all BS switches are made in NMOS and operate in on/off mode, i.e. NMOS' are either off, or in linear region. Since signal is passed in current mode through BS switches, the linearity performance can be greatly enhanced. The BS switches will contribute little in over IIP3 distortion.

Figure 4:
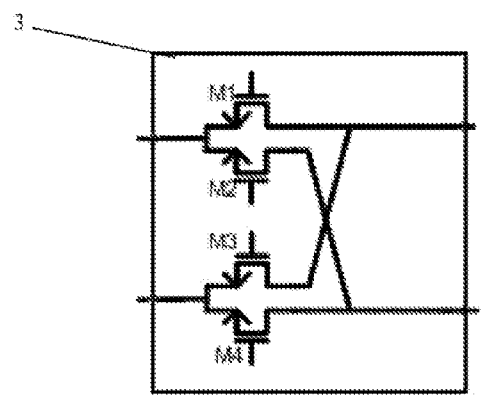
FIG. 4 shows a circuit schematic of an NHR mixer in FIG. 2.

FIG. 4 shows a circuit schematic for implementing NHR mixer, which is actually a simple passive NMOS mixer. The switching core is composed by M1, M2, M3 and M4.

Figure 5:
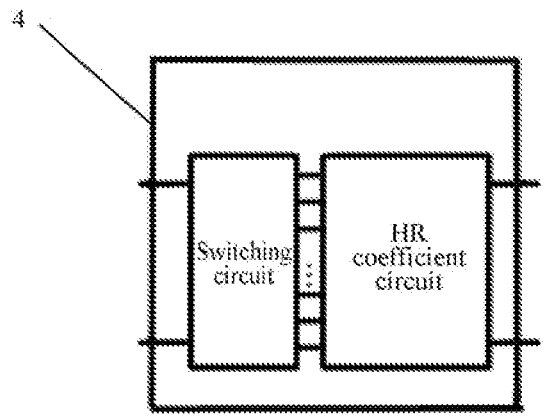
FIG. 5 shows a block diagram of an HR mixer in FIG. 2.

FIG. 5 shows a block diagram for implementing the HR mixer 4. HR mixer 4 works in the similar way as NHR mixer 3. The HR mixer 4 can have NMOS hard-switching core at the input. After it, the HR mixer 4 distributes signals through different paths with harmonic rejection coefficients. The distributed signals are summed at TIA input, then converted to voltage at TIA output.

When NHR mixer is working, HR mixer switching core is biased off, it provides high impedance for the signal path and has little impact on the system performance. Similarly, when HR mixer is on, MOSFETs in NHR mixer, such as NMOS from M1 to M4, are biased off.

All mixer switching cores in HR mixer and NHR mixer can be made in NMOS and operate in on/off mode, i.e. NMOS' are either off, or in linear region, driven by LO signal. They are passive since there is no DC current flowing through switching MOS'. Since signal is passed in current mode through BS switches and mixing switches, the linearity performance can be greatly enhanced.

Generally, the NHR mixer 3 covers whole input frequency range. For example, in TV system, it operates from 48 MHz to 862 MHz. HR mixers provide harmonic rejection for $2^{nd}$, $3^{rd}$, $4^{th}$ and high order harmonics, and they could cover up to half input frequency range. For example, in TV system, it runs from 48 MHz to 439 MHz (assuming 8 MHz signal bandwidth). If NHR mixer has large enough $2^{nd}$ order harmonic rejection due to fully differential structure, HR mixer could cover up to one third of input frequency range. For example, in TV system, it runs from 48 MHz to 295 MHz.

Figure 6:
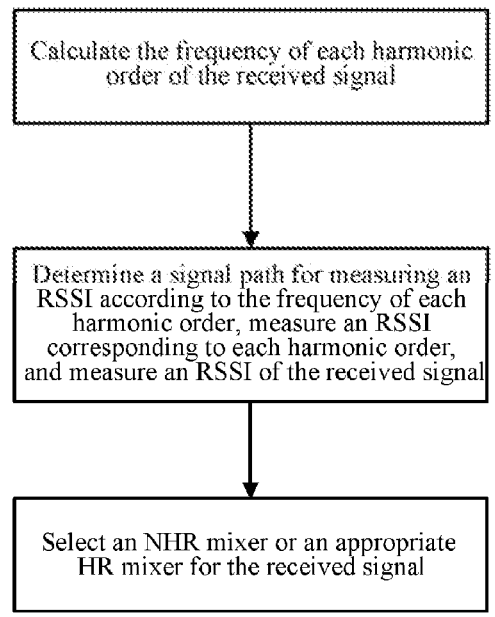
FIG. 6 shows a flow chart of an adaptive HR receiving method according to the present invention.

Referring to FIG. 6, FIG. 6 shows a flow chart of an adaptive HR receiving method according to the invention. The following describes the principle of the adaptive HR receiving method of the invention with reference to the receiving device as shown in FIG. 1.

After a received signal arrives at the receiving device 1, the received signal passes through the low noise amplifier 2, the NHR mixer 3, each HR mixer, i.e. HR mixer 41, 42, ..., 4N and then arrives at the control device 5; according to the receiving method of the present invention, the control device 5 first calculating a harmonic frequency of a received signal for each harmonic order. Once the received signal arrives at the control device 5, the frequency thereof is known; therefore, the frequency of each harmonic order can be calculated according to the frequency of the received signal. Subsequently, based on the calculated frequency of each harmonic order, the control device 5 selects a corresponding signal path according to the frequency of the received signal and the frequency of each harmonic order thereof, that is, selects an HR mixer or an NHR mixer for the received signal, and then the control device 5 measures an RSSI of the signal path. Finally, the control device 5 selects the NHR mixer or an appropriate HR mixer to receive the received signal according to the measured RSSI of each signal path and based on certain HR policy.

Figure 7:
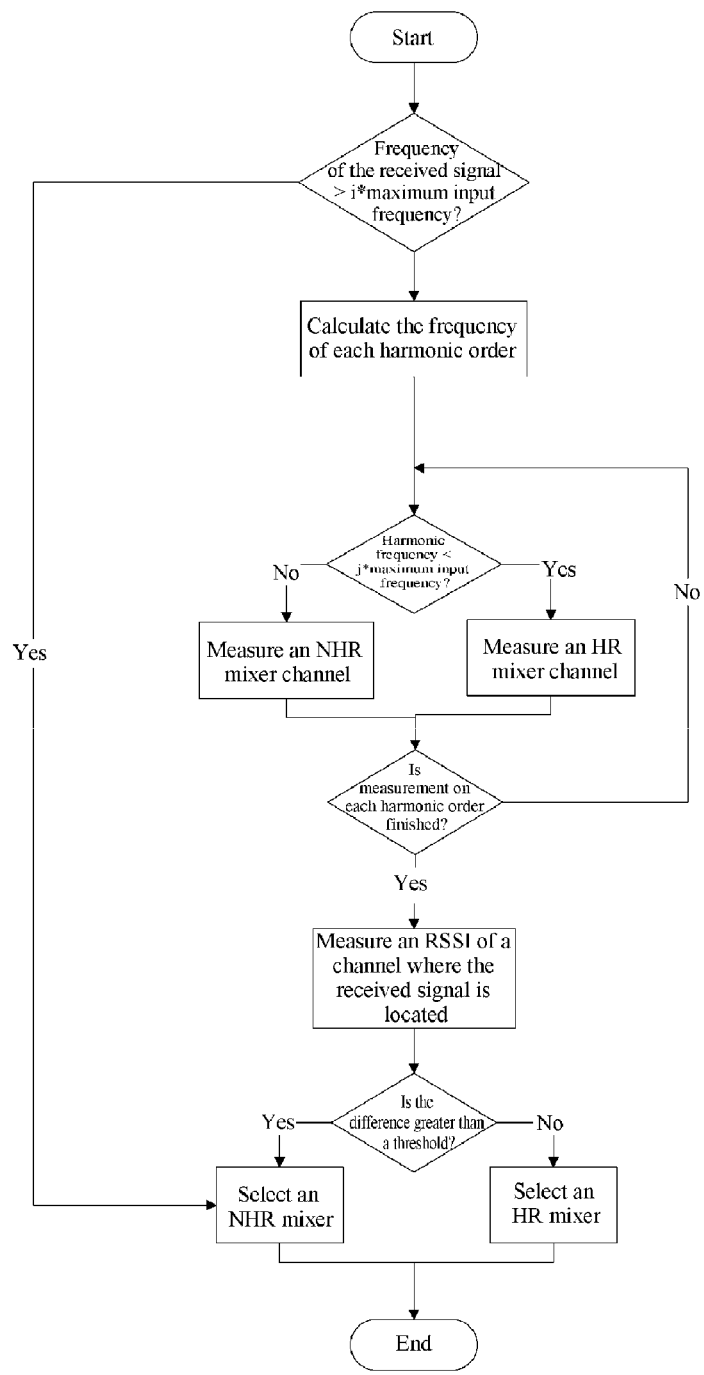
FIG. 7 shows a flow chart of an embodiment of an adaptive HR receiving method according to the present invention.

Referring to FIG. 7, the following describes the working process of the adaptive HR receiving method according to the invention with reference to the adaptive HR receiving device of the invention shown in FIG. 2.

Sign 2 in FIG. 2 is an implementation of the low noise amplifier 2 in FIG. 1, which is called as low noise transconductance amplifier (LNTA), and has an attenuator (or referred to as attenuation network) 21, a transconductance module 22, and a load 23 at input thereof. Sign 5 is an implementation manner of the control device 5, and includes a trans-impedance amplifier (TIA) 51, an analog channel selecting filter (low pass filter (LPF) in zero IF receiver) 52, a programmable gain amplifier (PGA) 53, an analog to digital converter (ADC) 54, and a digital signal processing (DSP) module 55.

First, the device 1 receives an input signal, and the frequency of the input signal is within the whole input signal band range. The signal passes through the LNTA 2, the NHR mixer 3, and the HR mixer 4 to arrive at the control device 5. The control device 5 performs steps of calculation, detection, and selection, and finally selects an appropriate HR policy for the received signal. In this embodiment, after arriving at the control device 5, the signal is subject to a series of conversions through the TIA 51, the LPF 52, the PGA 53, and the ADC 54, and arrives at the DSP 55 which performs calculation, detection, and selection for the signal, which are described in detail as follows:

a. Initial judgment: perform initial judgment on the signal to decide whether it needs harmonic rejection. For example, if RF input frequency>i*max input frequency, then it does not need harmonic rejection and an NHR mixer is directly selected for the received signal; otherwise, the process proceeds to the subsequent calculation step; wherein "i" could be ½ or ⅓ or other number, it is judged by the system and user.

b. Calculation: if it is need harmonic rejection, calculate frequency of each harmonic channel.

c. Measurement: The receiver is tuned to harmonic channels one by one to measure harmonic channel RSSI. For harmonic channel RSSI measurement, if channel frequency>j*max input frequency, using NHR mixer; if channel frequency<j*max input frequency, using HR mixer. Again, j is designed number by the system and user, the value of j is ⅓ in this embodiment.

d. Selection: tune the receiver to desired channel and found RSSI. If RSSI of desired channel minus RSSI of harmonic channel>HR_threshold, then do not need harmonic rejection; otherwise, need harmonic rejection and a HR mixer is selected for the received signal. Here HR_threshold is the threshold for HR operation. For example, HR_threshold could be 0 dB for $3^{rd}$ harmonic in 64 QAM demodulation preferably, and 10 dB in 256 QAM preferably. HR_threshold should be adjusted by the user.

It should be noted that, in the foregoing embodiments, in order to improve reception performance, the initial judgment step is added; however, this step is not indispensable in this method, and the initial judgment step can be omitted in some applications. In the measurement step, other policies may be used to perform selective measurement. Similarly, in the selection step, other policies may also be used to determine how to select an HR mixer or NHR mixer for the received signal.

The principle and efficacy of the present invention are exemplarily described in the foregoing embodiments, which are not intended to limit the present invention. Any person skilled in the art could make modifications or alterations to the foregoing embodiments within the concept and scope of the present invention. Therefore, any equivalent modification or alteration made by a person of ordinary skilled in the technical field without departing from the concept and technical thinking disclosed by the present invention shall fall within the scope of the claims of the present invention.

What is claimed is:

1. An adaptive harmonic rejection (HR) receiving device, comprising:
    a low noise amplification module;
    at least one harmonic rejection (HR) mixer;
    at least one non-harmonic rejection (NHR) mixer; and
    a control device, wherein a received signal first goes into low noise amplification module, and then passes through the at least one HR mixer or the at least one NHR mixer; the control device detects a receiving signal strength index (RSSI) after the received signal passes through the at least one HR mixer or the at least one NHR mixer, and selects an NHR mixer or an appropriate HR mixer for the received signal according to the detecting result.

2. The adaptive HR receiving device according to claim 1, wherein the control device comprises: a transimpedance amplifier (TIA), a low pass filter (LPF) connected to the TIA, a programmable gain amplifier (PGA) connected to the LPF, a ADC (analog to digital converter) connected to the PGA, and a digital signal processor (DSP) module connected to the ADC (analog to digital converter).

3. The adaptive HR receiving device according to claim 2, wherein the low noise amplification module is a low noise transconductance amplifier (LNTA), and the received signal is converted to a current signal after passing through the LNTA.

4. The adaptive HR receiving device according to claim 3, wherein the current signal is converted to a voltage signal at an output of the TIA.

5. The adaptive HR receiving device according to claim 3, wherein the LNTA comprises a load, and the load of LNTA is divided into several bands; the load of each band is formed of an L-C radio frequency filter and a switch; each band covers part of the input frequency range, and only one band is enabled during the same time period.

6. The adaptive HR receiving device according to claim 5, wherein the LNTA comprises a plurality of band selecting (BS) switches; the BS switches' output connects to both of the at least one HR mixers inputs and the NHR mixer inputs; the BS switches' input connects to load circuit of the specific load respectively; and only one BS switch operates in on mode during the same time period.

7. The adaptive HR receiving device according to claim 6, Wherein there is a mixer gain control stage inserted between the BS switches output and the NHR or HR mixer input.

8. The adaptive HR receiving device according to claim 2, wherein the digital signal processor (DSP) module comprises:
    a calculation unit, for calculating frequency of each harmonic channel of the received signal;
    a measurement unit, for measuring each harmonic channel RSSI one by one according to the frequency of each harmonic channel calculated by the calculation unit, and for measuring an RSSI of a certain received signal path; and
    a selection unit, for selecting the NHR mixer or an appropriate HR mixer for the received signal according to each harmonic channel RSSI measured and RSSI of the desired received signal path.

9. The adaptive HR receiving device according to claim 8, wherein the DSP module further comprises an initial judgment unit, for performing initial judgment on the signal to decide whether it needs harmonic rejection, and the judgment policy is as follows: if RF input frequency>i*max input frequency, then it does not need harmonic rejection and an NHR mixer is directly selected for the received signal.

10. The adaptive HR receiving device according to claim 9, wherein the selection unit adopted a policy to select an HR mixer or an NHR mixer for the received signal as follows: if RSSI of desired channel of the received signal minus RSSI of harmonic channel>HR_threshold, then do not need harmonic rejection and a NHR mixer is selected for the received signal; otherwise, need harmonic rejection and a HR mixer is selected for the received signal; wherein the HR_threshold is the threshold for HR operation.

11. An adaptive harmonic rejection receiving method, comprising:
    calculation: calculating frequency of each harmonic channel of the received signal;
    measurement: after the received signal passes through a low noise amplification, a non-harmonic rejection (NHR) frequency mixer, and HR mixers, selectively measuring a Received Signal Strength Indicator (RSSI) at an output of a signal path of an HR mixer or NHR mixer corresponding to the frequency of each harmonic order according to the frequency of each harmonic order of the received signal, and measuring an RSSI on a signal path corresponding to the frequency of the received signal; and
    selection: selecting an NHR mixer or an appropriate HR mixer for the received signal.

12. The adaptive HR receiving method according to claim 11, wherein the method further comprises an initial judgment step before the calculation step used to judge whether the received signal requires HR, and if HR is not required, an NHR signal path is directly selected for the received signal.

13. The adaptive HR receiving method according to claim 12, wherein in the initial judgment step, a policy for judging whether the received signal requires HR is as follows: if RF input frequency>i*max input frequency, then it does not need harmonic rejection.

14. The adaptive HR receiving method according to claim 13, wherein the value of the coefficient i is ½ or ⅓.

15. The adaptive HR receiving method according to claim 12, wherein in the measurement step, a policy for selective measurement is as follows:
    comparing the frequency of each harmonic order with a maximum input frequency one by one, if channel frequency>j*max input frequency, using NHR mixer and measuring RSSI of the received signal after passing through the NHR mixer; otherwise, if channel frequency<j*max input frequency, using HR mixer and measuring RSSI of the received signal after passing through the HR mixer.

16. The adaptive HR receiving method according to claim 15, wherein, the value of j is ½ or ⅓.

17. The adaptive HR receiving method according to claim 12, wherein in the selection step, a policy for selecting an HR mixer or an NHR mixer for the received signal is as follows:
    if RSSI of desired received signal channel minus RSSI of harmonic channel>HR_threshold, then a non-harmonic rejection mixer is needed; otherwise, a harmonic rejection mixer is needed.

* * * * *